Patented Sept. 3, 1935

2,013,319

UNITED STATES PATENT OFFICE 2,013,319

RUBBER COMPOSITION AND METHOD OF PRESERVING RUBBER

Waldo L. Semon, Cuyahoga Falls, Ohio, assignor to The B. F. Goodrich Company, New York, N. Y., a corporation of New York No Drawing. Application May 16, 1931, Serial No. 537,995

8 Claims. (Cl. 18—50)

This invention relates to the art of rubber manufacture, and particularly to the treatment of rubber to enable it to resist the various deteriorating influences to which rubber is normally subjected in service.

It has been found by experience and by numerous tests of rubber and rubber goods under almost every conceivable condition that the comparatively rapid deterioration which rubber undergoes is of three distinct kinds. The first kind of deterioration is that due to or accompanying oxidation, and manifesting itself in a gradual weakening of the entire mass of the rubber, accompanied sometimes by a softening and sometimes by a hardening of the rubber, the ultimate result of which is to reduce the strength practically to zero. The second kind of deterioration is caused by exposure to light, particularly to direct sunlight, and manifests itself in checking and cracking of the entire surface exposed to the light, the cracks gradually deepening, while the surface becomes progressively weaker and more and more brittle. The third kind of deterioration is induced by repeated flexing of the rubber, and manifests itself in cracks generally perpendicular to the direction of the strain and appearing especially at regions of localized high strain such as the bottoms of the grooves separating the tread blocks of pneumatic rubber tires.

Certain types of rubber goods are exposed predominantly to one type of deterioration, while others are exposed to several or all of them. For example, inner tubes for heavy pneumatic truck tires become quite hot during service, so that their deterioration is largely due to oxidation accelerated by the high temperature. Other articles such as surgical rubber goods are not frequently exposed to sunlight or to repeated flexing, so that oxidation is likewise the predominating factor in their life. On the other hand, articles such as bath caps, garden hose, automobile tops and running board mats are exposed to sunlight, and frequently deteriorate very rapidly because of such exposure. Other articles again, such as rubber transmission belting, are submitted to rapidly repeated flexing which brings the so-called fatigue cracking into prominence. All three of these types of deterioration are observed in such articles as automobile tires. If the deterioration of these and other rubber articles is not controlled or checked, they will frequently fail long before they are worn out or have had an opportunity to serve a useful life. It is therefore evidently very desirable to be able to control and retard each of the three kinds of deterioration wherever it occurs.

The agents, known generally as age-resisters, which are employed for the purpose of retarding the deterioration of rubber are frequently organic substances of high molecular weight, difficult to grind a uniformly fine powder because of their tendency to agglomerate, and difficult to incorporate intimately and homogeneously into rubber because of their insolubility in rubber and their tendency to cake on the mixing mill. The presence of specks and gross agglomerations of such substances in the finished rubber goods constitutes a serious defect which may lead to a premature failure, particularly of articles submitted to any considerable strain. An incomplete dispersion of the age-resister into the rubber has the further disadvantage that its effectiveness is greatly diminished because of the consequent removal of a considerable portion thereof from effective contact with the rubber. It is therefore of the utmost importance that the age-resisters be uniformly and completely dispersed in the rubber.

The objects of this invention accordingly include the provision of a method for preserving rubber from any type of deterioration to which it may be subjected. Another object is to provide a method of incorporating age-resisters intimately and uniformly with rubber. A further object is to provide a method for effectively preserving rubber with a minimum proportion of age-resister. Another object is to provide rubber compositions capable of resisting deterioration to an unusual degree. Further objects will be apparent from the following description of the invention.

The objects of this invention are accomplished by incorporating into a rubber composition, before vulcanization, a mixture of substances, one or more of which is an effective age-resister. In particular, the invention includes preparing a mixture of an anti-oxidant with a neutral waxy substance and incorporating the mixture into rubber. The anti-oxidant is preferably a nitrogenous substance such as a secondary aromatic amine, while the waxy substance is preferably a hydrocarbon wax capable of retarding the deterioration due to sunlight, such as petrolatum base.

The anti-oxidant constituent of the mixture may consist of a simple diaryl-amine such as diphenylamine, ditolylamine, dixylylamine, dinaphthylamine, di-biphenylamine, phenyl-toluidine, isopropenyl diphenylamine, phenyl-biphenylamine, phenyl-naphthylamine, phenylamino tetraphenylmethane, etc., or a secondary aromatic diamine such as diphenyl phenylene diamine, diphenyl benzidine, dinaphthyl phenylene diamine, etc., or a mixed aklyl-arylamine such as methyl-naphthylamine, diphenyl ethylene diamine, ditolyl ethylene diamine, methylamino diphenylamine, etc., or a substituted secondary aromatic amine, such as amino diphenylamine, diamino diphenylamine, dimethylamino diphenylamine, aminophenyl-naphthylamine, hydroxy diphenylamine, dihydroxy diphenylamine, hydroxyphenyl-biphenylamine, aminophenyl-aminophenol, methoxy diphenylamine, ethoxy diphenlyamine, methoxy phenyl naphthylamine, nitroso diphenylamine, chloro diphenylamine, or a phenol such as hydroquinone, phenyl phenol, naphthol, dihydroxy diphenylether, dihydroxy diphenyl methane, dihydroxy diphenyl dimethyl methane, dihydroxy biphenyl, or an aldehyde-amine such as aldol alpha-naphthylamine, acetaldehyde aminodiphenylamine, or even other known types of anti-oxidants, such as dialkyl aminophenols, hydroxy triarylamines, tetra-aryl hydrazines, tetra-alkyl aromatic diamines, amino-azo aromatic hydrocarbons, diaryl nitrosamines, thio-diarylamines, etc. In these compounds in which several possible positions may be taken by the constituent radicals, any one of the isomeric compounds may be used, although the para substituted compounds are generally preferred. The substances enumerated above are all anti-oxidants, although their properties vary over a considerable range.

Many of the anti-oxidants, that is, substances which retard the deterioration due to oxidation, likewise are capable of retarding or repressing the appearance of flexure cracks or failure due to fatigue. This is particularly true of the di-arylamines. However, these two properties are not interdependent for many of the substances which are most effective in retarding deterioration due to oxidation have only a slight effect on fatigue cracking, whereas many of those which are most effective in preventing fatigue cracking are comparatively weak as anti-oxidants.

The most effective anti-oxidants are in most cases substances of comparatively high molecular weight, such as diphenyl or dinaphthyl p-phenylene diamine, diphenyl benzidine, di (phenylamino) diphenylamine, phenylamino tetraphenylmethane, and tetraphenyl hydrazine. Of these, the diaryl aromatic diamines are outstanding in their ability to retard oxidation of rubber. The substances exerting the greatest effect on the fatigue cracking or rubber, on the other hand, are generally substances of comparatively low molecular weight such as diphenylamine, phenyl-tolylamine, phenyl-naphthylamine, ditolylamine, isopropenyl diphenylamine, and hydroxy diphenylamine.

The maximum resistance to both types of deterioration may therefore be obtained by mixing two or more of these nitrogenous anti-oxidants.

The substance which is mixed with the above-mentioned anti-oxidants may be any neutral, solid, waxy substance, such as paraffin wax, petrolatum base, Montan wax, ceresin, ozokerite, Chinese wax, spermaceti, beeswax, etc. The most useful of these waxes are the hydrocarbon waxes, and particularly those which have a high melting point and are only slightly soluble in rubber, such as ozokerite and petrolatum base. The petrolatum base is generally preferred because of its low price, and its outstanding ability to prevent sun-checking, even when employed in small proportions. The petrolatum base, although chemically very closely related to the paraffin waxes, has a higher melting point and a considerably higher average molecular weight. It appears to contain colloidal constituents which repress or prevent crystallization, and therefore is softer and more plastic than a refined paraffin wax, in spite of its higher melting point, and is likewise more readily incorporated into rubber. It need not be employed in a carefully purified condition, but may contain an ordinary paraffin wax or even a liquid oil, if the softening effect of the latter is not objectionable. Commercial waxy petrolatum bases having melting points between 65 and 72° C. have given very good results, the best being an intermediate product melting at about 68° C.

These waxes are extremely effective in preventing deterioration due to sunlight, and likewise help to impart a fine, glossy finish to rubber goods. Substances which are distinctly acidic in nature, such as the higher fatty acids, do not exhibit the advantageous properties of the neutral substances enumerated above, either in regard to aiding the incorporation of the anti-oxidants into rubber or in regard to retarding the deterioration due to sunlight, and are therefore excluded from the scope of this invention. The waxes are generally mixed with the anti-oxidants by melting the constituents together, and permitting them to cool and solidify after they are thoroughly mixed. The product is ordinarily a soft, smooth, unctuous paste which is very readily incorporated into rubber to form a uniform and homogeneous admixture. However, some of the advantages of this invention are secured by adding the constituents separately to the rubber composition.

In those cases in which the age-resister mixture of this invention is melted, and measured out and incorporated in the rubber in a liquid state, it is important that the proportions of the various constituents be so regulated that they are completely soluble in one another at temperatures above the melting point, in order that no segregation of the constituents may occur in the fluid mixture. The same precaution as to proportions should be observed in the preparation of the mixtures of this invention, unless special precautions are taken to maintain a uniform distribution of the constituents during cooling and solidification.

As a specific example of one embodiment of this invention, phenyl beta-naphthylamine is melted with an equal quantity of Montan wax, and is stirred while cooling. The mixture is a waxy solid which is readily incorporated into rubber. Vulcanized rubber compositions containing this mixture not only resist deterioration due to oxidation at least as well as those containing the phenyl-beta-naphthylamine alone, but also resist sun-checking, even after prolonged exposure to sunlight.

As another example, phenyl beta-naphthylamine is melted with one-fourth its weight of a paraffin wax with a melting point of approximately 53–54° C. and stirred while cooling. The product is much more readily incorporated in rubber than the phenyl beta-naphthylamine alone, and confers upon the rubber good age-resisting properties of all three kinds discussed above.

Diphenyl p-phenylene diamine is melted with a third of its weight of a petrolatum base with a melting point of about 68° C. The product is readily and homogeneously incorporated into rubber, whereas the diphenyl p-phenylene diamine alone is very difficult to disperse satisfactorily. The rubber so treated exhibits a greater and far more uniform resistance to the deterioration due to oxidation than rubber similarly treated with the diphenyl p-phenylene diamine alone, and in addition exhibits a fine, glossy finish and an excellent degree of resistance to sun-checking.

A liquid mixture of isomeric ditolylamines is heated with a third of its weight of a petrolatum base with a melting point of about 68° C. The product upon cooling is an unctuous paste which is readily handled either in its solid, pasty condition, or in a liquid state at a moderately elevated temperature. It imparts anti-oxidant properties to rubber, as well as an outstanding ability to resist fatigue-cracking and sun checking.

A mixture of 16 parts by weight of diphenyl p-phenylene diamine, 64 parts of a liquid mixture of isomeric ditolylamines, and 20 parts of a petrolatum base melting at about 68° C. is heated to assure a homogeneous solution of its constituents, and solidified by cooling. It is an unctuous paste which contains visible small crystals of some of the constituents, but is readily rubbed to an impalpably smooth, plastic condition. It disperses in rubber with the greatest ease, to give a perfectly homogeneous composition capable of resisting fatigue-cracking as well as deterioration due to oxidation or exposure to sunlight.

It is to be understood that the scope of this invention is not to be limited by the specific examples given for illustrative purposes, for it is susceptible of numerous modifications in its various parts without exceeding the spirit and scope of the invention as defined in the appended claims.

I claim:

1. The method of preserving rubber which comprises incorporating into rubber before vulcanization a homogeneous plastic mass resulting from the cooling of a solution of a diarylamine in a molten neutral wax.

2. The method of preserving rubber which comprises incorporating into rubber before vulcanization a homogeneous plastic mass resulting from the cooling of a solution of a diarylamine in a molten hydrocarbon wax.

3. The method of preserving rubber which comprises incorporating into rubber before vulcanization a homogeneous plastic mass resulting from the cooling of a solution of a diarylamine in a petrolatum base.

4. The method of preserving rubber which comprises incorporating into rubber before vulcanization a homogeneous plastic mass resulting from the cooling of a solution of a diaryl aromatic diamine in a molten hydrocarbon wax.

5. The method of preserving rubber which comprises incorporating into rubber before vulcanization a homogeneous plastic mass resulting from the cooling of a solution of diphenyl p-phenylene diamine in a petrolatum base.

6. The method of preserving rubber which comprises incorporating into rubber before vulcanization a homogeneous plastic mass resulting from the cooling of a solution of ditolylamine in a petrolatum base.

7. The method of preserving rubber which comprises incorporating into rubber before vulcanization a homogeneous plastic mass resulting from the cooling of a solution of a diarylamine containing only two aromatic nuclei and a diaryl aromatic diamine in a molten hydrocarbon wax.

8. The method of preserving rubber which comprises incorporating into rubber before vulcanization a homogeneous plastic mass resulting from the cooling of a solution of ditolylamine and diphenyl p-phenylene diamine in a molten petrolatum base.

WALDO L. SEMON.